June 23, 1959 R. C. NORRIE 2,891,786
SUSPENSION OF AXLE IN VEHICLES EMPLOYING AIR-SPRING
Filed Feb. 21, 1956 2 Sheets-Sheet 1

INVENTOR.
ROBERT C. NORRIE
BY
ATTORNEYS

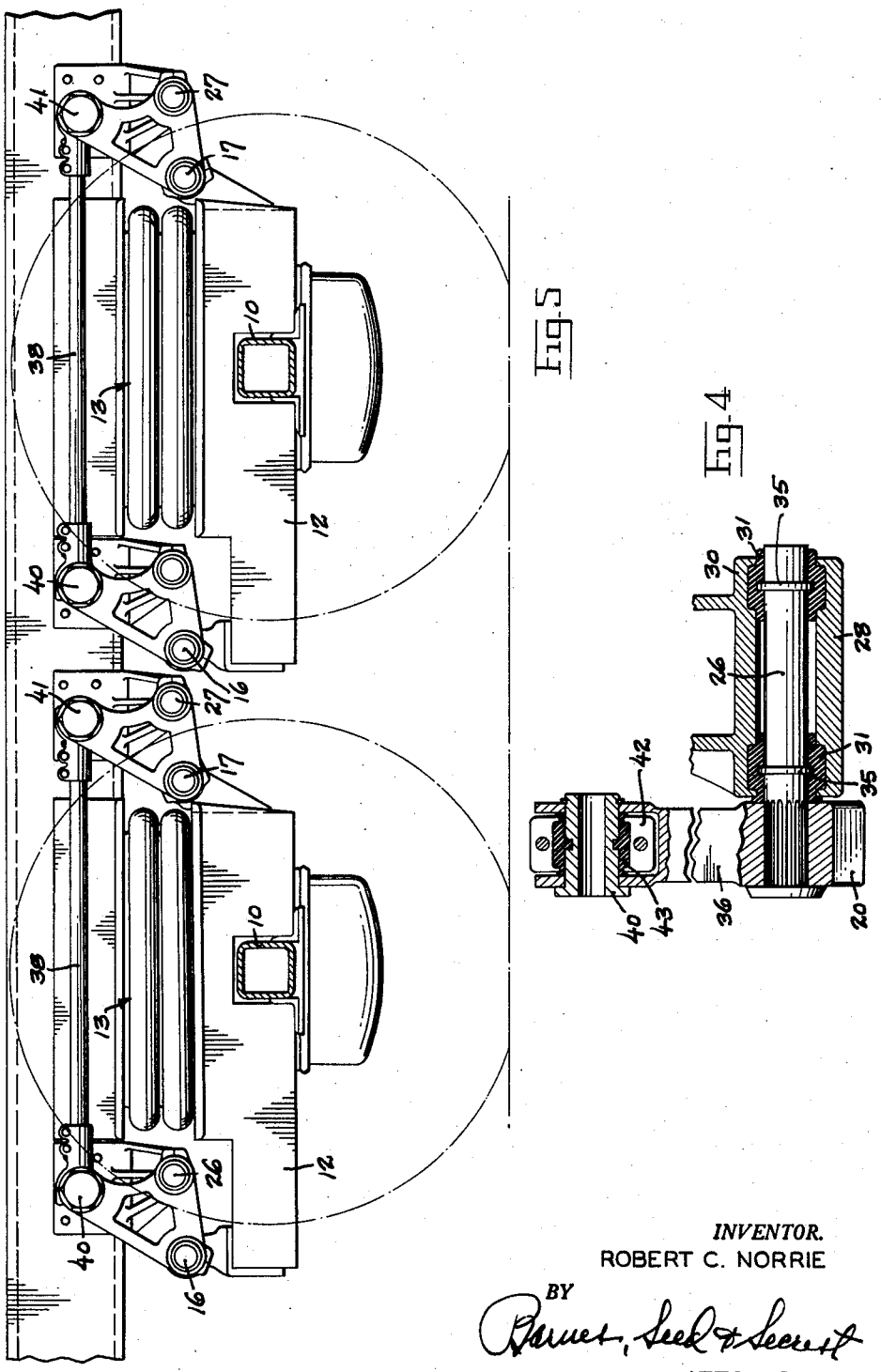

United States Patent Office 2,891,786
Patented June 23, 1959

2,891,786

SUSPENSION OF AXLE IN VEHICLES EMPLOYING AIR-SPRING

Robert C. Norrie, Seattle, Wash., assignor to Kenworth Motor Truck Company, Division of Pacific Car and Foundry Company, Seattle, Wash., a corporation of Washington Application February 21, 1956, Serial No. 566,886

7 Claims. (Cl. 267—11)

This invention relates to a suspension for the rear axle or axles of a truck or a trailer, particularly a suspension including an air spring, and is applicable to a single driving axle, two driving axles, a driving axle and a trailing axle, two trailer axles, or a single trailer axle.

For its principal object the invention aims to provide a suspension for an axle or axles, having an air spring interposed between the axle and the vehicle frame, which will effectively position the axle or axles with reference to the vehicle frame. It is a further and particular object to provide an assembly in which the positioning is accomplished by a perfected linkage including companion bell-cranks in association with a compression tie-rod.

A yet further and particular object is to engineer a suspension system of the nature described, having a torsional stabilizer or sway bar connecting the bell-cranks at one side to the bell-cranks at the other side of the vehicle.

As a further object still, the invention aims to provide a perfected suspension of the nature described requiring little or no maintenance.

With the above and other more particular objects and advantages in view and which will appear and be understood in the course of the following description and claims, the invention consists in the novel construction and in the adaptation and combination of parts hereinafter described and claimed.

In the accompanying drawings:

Fig. 4 is a fragmentary transverse vertical sectional view on line 4—4 of Fig. 1, employing the same scale as that of Fig. 2; and Fig. 5 is a fragmentary longitudinal vertical sectional view similar to Fig. 1 excepting that the suspension system is shown applied to a tandem-axle vehicle.

Figure 1:
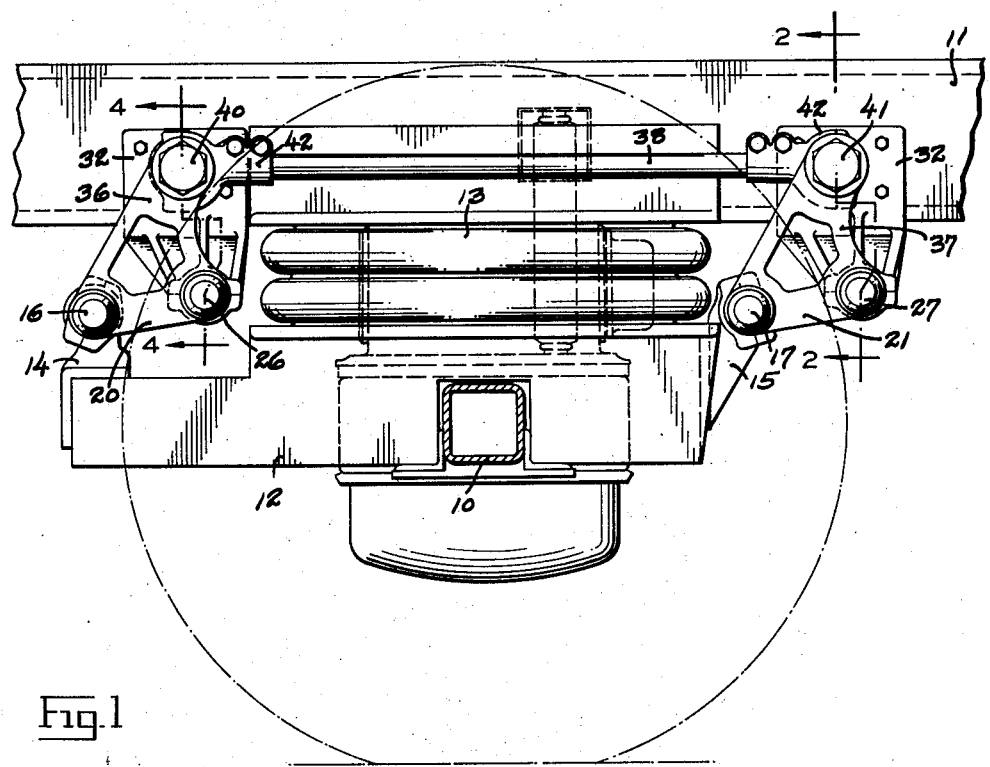
Figure 1 is a fragmentary longitudinal vertical section taken exteriorly of the main frame illustrating the rear portion of an automotive vehicle incorporating suspension mechanism embodying teachings of the present invention.

Before proceeding with a detailed description of the invention it may be here pointed out that each of the two assemblies shown in the tandem-axle truck portrayed in Fig. 5 are or may be basically identical with the single assembly illustrated in the single-axle truck of Fig. 1. A description of the one will hence suffice for the other. In said Fig. 1 the axle is denoted by the numeral 10 and lies below a vehicle frame having the usual right and left longitudinal principals 11. Each end of the axle has a respective bolster 12 welded or otherwise rigidly secured in surmounting relation thereon, and received between each such bolster and the related frame principal 11 is an air spring denoted generally by 13. The construction of the air spring is no part of the present invention and any such spring may advantageously be used.

Welded or otherwise rigidly secured to said bolster so as to occupy positions one at the front and the other at the rear thereof is a respective pillow block, as 14 and 15, providing journal mountings for wrist pins, as 16 and 17. These wrist pins connect the bolster with similarly directed horizontal legs 20 and 21 of bell-cranks fulcrumed to the frame. The fulcrum mountings are such as will impose yielding restraint upon the bell-cranks, and to such end the fulcrum pins 26 and 27 are splined or otherwise rigidly secured to the bell-cranks and are each gripped by a respective rubber bushing 31 placed under compression by the clamping action of a cap 28 boltably secured to a bearing block 30 provided by a frame-carried hanger. The hangers are desirably angular in shape when viewed from the end, presenting an outer vertical leg 32 which overlies and is secured to the channel principal 11 and an inwardly directed horizontal leg 33 which underlies and is secured to a cross-member 34 of the frame.

There are two axially spaced-apart bushings for each fulcrum pin, and made an integral part of such pins so as to be embedded in the rubber of the bushings is a respective thrust collar 35. The bushings are themselves locked against endwise displacement by being caught in registering semi-cylindrical cavities presented by the block-and-cap complements 30—28 of each bearing. The fulcrum pin 27, and namely the fulcrum pin which lies to the rear of the bolster 12, is a through-pin extending from the bell-crank at one side to the bell-crank at the other side of the vehicle, and performs the function of a torsion rod partaking of a torsional wind-up as wrist action of the pin end at either side of the vehicle is countered by resistance from the pin end at the opposite side. The forward fulcrum pin 26 is a stud pin, and this is to say that the pin at one side is separate from the pin at the other side of the vehicle.

Figures 2, 3:
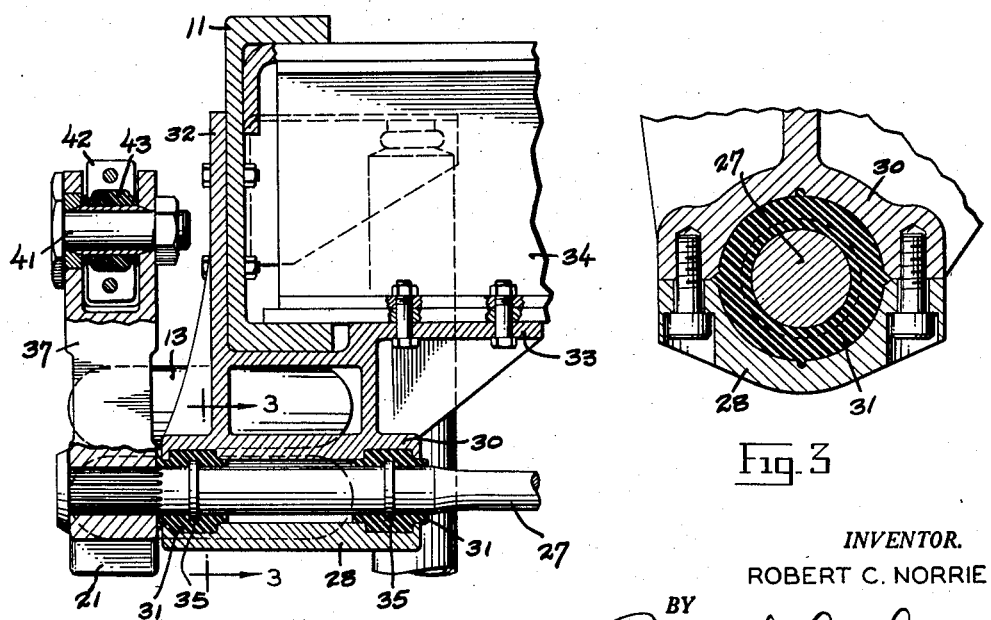
Fig. 2 is a fragmentary transverse vertical sectional view taken to an enlarged scale on line 2—2 of Fig. 1 to illustrate one side of the vehicle, it being here pointed out that both sides are structurally identical.
Fig. 3 is a fragmentary longitudinal vertical sectional view drawn to a yet larger scale on line 3—3 of Fig. 2.

The other legs 36 and 37 of the bell-cranks extend upwardly from the fulcrums, and are tied together by a compression rod 38. Wrist pins 40 and 41 connect the compression rod to the bell-cranks, with the crank arms 36 and 37 being terminally forked to receive bearing heads 42 fixedly attached to the ends of the rod. Each said bearing head comprises a block and cap combination, and there is compressed between these cap and block complements a respective rubber bushing 43 to produce resilient mountings for the wrist movement of the sleeves. The use of rubber bushings eliminates need for lubrication and consequently holds maintenance costs to a minimum while at the same time cushioning road shocks and reducing wear. While I have portrayed in Figs. 2 and 4 two different ways in which the last-described wrist mountings may be produced, both are essentially alike insofar as function is concerned.

It is thought that the nature of my perfected linkage, and the manner in which the same functions in positioning, relative to the vehicle frame, the axle or axles of a vehicle employing an air spring, will have been clearly understood from the foregoing description of my now preferred illustrated embodiments. Changes in the details of construction will suggest themselves and can be resorted to without departing from the spirit of the invention, wherefor it is my intention that no limitations be implied and that the hereto annexed claims be given the broadest interpretation to which the employed language fairly admits.

What I claim is:

1. In a suspension hook-up for springing the frame of a vehicle from an axle and at each side of the vehicle employing an air spring as the primary springing agent, a bolster straddling the axle at each end thereof, a stabilizing rod journaled adjacent each of its ends from the frame for wrist movement about a transverse horizontal axis spaced longitudinally from the axle with its two ends projecting beyond the journals into the approximate longitudinal vertical planes occupied by the bolsters, bellcranks anchored to said projecting ends of the rod so as to pivot with the rod ends about the center of the latter as a fulcrum, a respective bell-crank fulcrumed to the frame at each side of the vehicle for wrist movement about a transverse horizontal axis spaced longitudinally from the axle at the side thereof opposite the stabilizing rod, one leg of each of said bell-cranks being forked and extending vertically in the same direction from the fulcrums and the other leg of each of said bell-cranks extending horizontally in the same direction from the fulcrums, a wrist connection from the free end of the horizontal leg of each bell-crank to the related bolster, and a compression tie-rod at each side of the vehicle extending between the related bell-cranks and having a wrist connection from its ends to the free ends of the vertical legs of said bell-cranks, said wrist connections between the forked vertical legs of the bell-cranks and the tie-rods each comprising a pin traversing the forks of the respective vertical leg, a block and cap combination carried by the respective tie-rod, and a rubber bushing clamped between said block and cap combination and gripping said pin.

2. In suspension mechanism for springing the frame of a vehicle from an axle and employing an air spring at each side of the vehicle as the primary springing agent, the combination with said frame, the axle, and the air springs, a stabilizing rod extending from one to the other side of the vehicle and journaled from the frame at each side thereof for wrist movement about a transverse horizontal axis spaced to the rear of the axle, each journal for said stabilizing rod comprising a hanger carried by the frame and having block-and-cap complements, and a rubber bushing compressed between said complements to thereby tightly grip the rod, rear bell-cranks anchored to said rod adjacent each of its ends so as to pivot with the rod ends about the center of the rod as a fulcrum, a respective front bell-crank fulcrumed to the frame at each side of the vehicle for wrist movement about a transverse horizontal axis spaced to the front of the axle, all of said bell-cranks having one leg extending vertically in the same direction from the fulcrum and the other leg extending horizontally in the same direction from the fulcrum, a wrist connection from the free end of the horizontal leg of each bell-crank to the related end of the axle, and a compression tie-rod at each side of the vehicle extending between the related bell-cranks and having a wrist connection from its ends to the free ends of the vertical legs of said bell-cranks.

3. Suspension mechanism according to claim 2 in which there are at least two of said rubber bushings, axially spaced apart, for each end of the stabilizing rod.

4. In a suspension hook-up for springing the frame of a vehicle from an axle and employing a fluid-responsive spring at each side of the vehicle as the primary springing agent, said hook-up comprising, at each side of the vehicle, a bolster secured to the axle, a pair of lever arms each journaled from the frame for wrist movement about a respective transverse horizontal axis one located to the front and the other to the rear of the axle and extending approximately horizontally from said axes with the free end of one said arm having a wrist connection with the bolster at one side of the axle and with the free end of the other arm having a wrist connection with the bolster at the other side of the axle, and a parallel linkage extending from one to the other of said lever arms causing a substantial counterpart of any vertical motion transferred from the axle to either one of said lever arms to be passed through the linkage to the other of said lever arms, the journal for each said lever arm comprising a hanger carried by said frame and having block-and-cap complements, a fulcrum pin fast to the arm, and a rubber bushing compressed by said complements to thereby tightly grip said fulcrum pin.

5. Structure according to claim 4 in which one of the fulcrum pins is a through-pin extending from the lever arm at one side to the corresponding lever arm at the other side of the vehicle, said through-pin admitting to a torsional wind-up.

6. In a suspension hook-up for springing the frame of a vehicle from an axle and employing a fluid-responsive spring at each side of the vehicle as the primary springing agent, said hook-up comprising, at each side of the vehicle, a bolster secured to the axle, a pair of lever arms each journaled from the frame for wrist movement about a respective transverse horizontal axis one located to the front and the other to the rear of the axle and extending approximately horizontally from said axes with the free end of one said arm having a wrist connection with the bolster at one side of the axle and with the free end of the other arm having a wrist connection with the bolster at the other side of the axle, and a parallel linkage extending from one to the other of said lever arms causing a substantial counterpart of any vertical motion transferred from the axle to either one of said lever arms to be passed through the linkage to the other of said lever arms, said parallel linkage comprising a compression tie-rod connecting by each of its two ends with the free end of a vertically disposed leg of a respective bell-crank, said free ends being forked, each of said horizontal levers functioning as the other leg of a respective one of said bell-cranks, the connections between said vertical legs of the bell-cranks and the tie-rod comprising, in each instance, a pin traversing the two arms of the fork and gripped by a rubber bushing under compression fixedly carried by the tie-rod.

7. In a vehicle having an axle sprung from the frame by an air spring, the combination with the vehicle frame, the axle, and the air spring: a bolster secured to the axle, identical bell-cranks fulcrumed to the frame to occupy positions one at the front and the other at the rear of the axle with one leg of each bell-crank extending vertically in the same direction from the fulcrum and the other leg of each bell-crank extending horizontally in the same direction from the fulcrum, a wrist connection from the free end of each horizontal leg to the related end of the bolster, and a compression tie-rod extending between the bell-cranks and having a wrist connection from its ends to the free ends of the vertical legs of said bell-cranks, the distances between the axes of said first named wrist connections, between the axes of said second-named wrist connections, and between the bell-crank fulcrums being all identical, the fulcrum connections for the bell cranks and the wrist connections between bell-cranks and tie-rod comprising, in each instance, a pin fixed to the bell-crank and gripped by a compressed bushing of elastic rubber so connected in turn to the frame or the tie-rod, as the case may be, as to impose a yielding restraint against wrist motion of the concerned pin.

References Cited in the file of this patent

UNITED STATES PATENTS

| 914,201 | Surcouf | Mar. 2, 1909 |
| 991,000 | McIntyre | May 2, 1911 |
| 1,137,741 | Charley | May 4, 1915 |
| 1,838,591 | Swansen | Dec. 29, 1931 |
| 2,155,867 | McIntyre | Apr. 25, 1939 |

FOREIGN PATENTS

| 880,843 | France | Apr. 6, 1943 |